United States Patent [19]

Peng et al.

[11] 4,415,697

[45] Nov. 15, 1983

[54] PAINT COMPOSITION COMPRISING HYDROXY FUNCTIONAL FILM FORMER AND CROSSLINKED DISPERSION FLOW CONTROL ADDITIVE

[75] Inventors: Stephen C. Peng, Utica; John D. Nordstrom, Detroit, both of Mich.

[73] Assignee: Ford Motor Company, Dearborn, Mich.

[21] Appl. No.: 292,858

[22] Filed: Aug. 14, 1981

Related U.S. Application Data

[63] Continuation-in-part of Ser. No. 199,394, Oct. 23, 1980, abandoned, and a continuation-in-part of Ser. No. 199,395, Oct. 23, 1980, abandoned, and a continuation-in-part of Ser. No. 199,761, Oct. 23, 1980, abandoned.

[51] Int. Cl.³ .................. C08G 12/32; C08L 61/28; C08F 220/10; C08F 2/14

[52] U.S. Cl. .................. 524/512; 523/333; 524/315; 524/317; 524/417; 524/437; 524/507; 524/517; 524/521; 524/522; 524/516; 524/523; 525/125; 525/155; 525/162; 525/208; 525/212; 525/221; 525/223; 525/450; 525/451; 525/518

[58] Field of Search .............. 525/285, 282, 286, 291, 525/288, 208, 296, 212, 277, 223, 293, 221, 301, 303, 66, 69, 125, 298, 155, 450, 518; 524/512, 504, 517, 523, 522, 521, 516; 523/333, 334

[56] References Cited

U.S. PATENT DOCUMENTS

| | | | |
|---|---|---|---|
| 3,875,255 | 4/1975 | Kato et al. | 525/286 |
| 3,919,347 | 11/1975 | Katsimbas | 525/286 |
| 3,926,899 | 12/1975 | Nordberg | 525/286 |
| 3,966,667 | 6/1976 | Sullivan et al. | 260/31.2 N |
| 4,002,699 | 1/1977 | Labana et al. | 525/155 |
| 4,025,474 | 5/1977 | Porter et al. | 528/245.5 |
| 4,033,917 | 7/1977 | Sekmakas et al. | 525/286 |
| 4,064,087 | 12/1977 | Das | 525/286 |
| 4,065,518 | 12/1977 | Labana et al. | 525/286 |
| 4,147,688 | 4/1979 | Makhlouf et al. | 260/33.6 EP |
| 4,180,489 | 12/1979 | Andrew et al. | 260/70 |
| 4,220,679 | 9/1980 | Backhouse | 427/408 |
| 4,242,384 | 12/1980 | Andrew et al. | 428/463 |
| 4,268,547 | 5/1981 | Backhouse | 427/388.5 |
| 4,304,701 | 12/1981 | Das et al. | 525/286 |
| 4,322,508 | 3/1982 | Peng et al. | 525/110 |
| 4,336,177 | 6/1982 | Backhouse et al. | 525/902 |

FOREIGN PATENT DOCUMENTS 2351519  4/1974  Fed. Rep. of Germany ...... 525/286

*Primary Examiner*—Melvyn I. Marquis
*Assistant Examiner*—Herbert J. Lilling
*Attorney, Agent, or Firm*—Roger L. May; Keith L. Zerschling

[57] ABSTRACT

Coating compositions comprising hydroxy functional film formers and a novel flow control additive comprising a stable crosslinked dispersion prepared by addition polymerization of (a) first and second ethylenically unsaturated monomers each bearing functionality capable of crosslinking with the other and (b) at least one other monoethylenically unsaturated monomer, in the presence of (I) organic liquid which is a solvent for the polymerizable monomers, but a non-solvent for the resultant polymer and (II) a novel polymeric dispersion stabilizer. The stabilizer bears pendent ethylenic unsaturation capable of reacting with monomers employed in the addition polymerization and comprises a random copolymer segment of ethylenically unsaturated monomers, some of which are characterized in that homopolymers thereof would be substantially insoluble in the organic liquid used to form the stable dispersion and some of which are characterized in that homopolymers thereof would be substantially soluble in the organic liquid used to form the stable dispersion.

49 Claims, No Drawings

PAINT COMPOSITION COMPRISING HYDROXY FUNCTIONAL FILM FORMER AND CROSSLINKED DISPERSION FLOW CONTROL ADDITIVE

This application is a continuation-in-part of Ser. Nos. 199,394, 199,395 and 199,761 filed Oct. 23, 1980 and now abandoned.

BACKGROUND OF THE INVENTION

This invention relates to coating compositions comprising hydroxy functional film former and a novel flow control additive which improves the flowout characteristics of the coating composition, increasing both smoothness and evenness of the coating film. The compositions are particularly well suited for automotive applications wherein the coating composition includes metallic pigment. More particularly, the invention relates to such coating compositions wherein the novel flow control additive is a stable crosslinked dispersion prepared by addition polymerization of (a) first and second ethylenically unsaturated monomers each bearing functionality capable of crosslinking with the other and (b) at least one other monoethylenically unsaturated monomer, in the presence of (I) organic liquid which is a solvent for the polymerizable monomers, but a non-solvent for the resultant polymer and (II) a particular polymeric dispersion stabilizer which bears pendent ethylenic unsaturation capable of reacting with the monomers employed in the addition polymerization. Still more particularly, the invention relates to such compositions including the stable crosslinked dispersions wherein the polymeric dispersion stabilizer comprises a random copolymer segment of ethylenically unsaturated monomers, some of which are characterized in that homopolymers thereof would be substantially insoluble in the organic liquid used to form the stable dispersion and some of which are characterized in that homopolymers thereof would be substantially soluble in the organic liquid used to form the stable dispersion. Preferred compositions including the stable crosslinked dispersions are intermediate and high solids thermosetting compositions which are adapted to provide an automotive topcoat demonstrating hardness, high gloss, outstanding durability and excellent resistance to solvents and water.

Because of increasingly strict solvent emission regulations in recent years, low solvent emission paints have become desirable. A number of intermediate and high solids paint compositions have been proposed to meet these low solvent emission requirements. However, many of these compositions are deficient because of difficulty in application, poor flow out, lack of smoothness and evenness and poor distribution of pigment, particularly metallic flake pigments. The deficiency in compositions including metallic flake results from undesired reorientation of the metallic flake during application and curing of the coating. Flake reorientation results primarily because of the very low viscosity resins used in paint compositions to accommodate intermediate and high solids. The viscosity of these resins is not sufficient to immobilize the flakes which tend to redistribute themselves to show "reverse flop" and nonuniform distribution.

The preferred coating compositions of this invention, as a result of the improved flow control additive component thereof, combine desirable properties, including lower solvent content and low application viscosity, while also overcoming deficiencies of some of the previously proposed intermediate and high solids materials, thereby achieving intermediate and high solids coating compositions particularly adapted for automotive topcoats and still more particularly adapted for automotive topcoats including metallic flake as pigment.

Concurrently filed application Ser. No. 292,963 entitled "Polymeric Dispersion Stabilizer and Stable Dispersion Prepared Therefrom" assigned to the assignee of this application claims stable crosslinked dispersions employed as flow control additives in compositions of this invention. This concurrently filed application is a continuation-in-part of Ser. Nos. 199,874 and 199,396 filed Oct. 23, 1980.

Compositions of the type disclosed and claimed in this application, except for the addition of the stable crosslinked dispersion flow control additive, were developed by coworkers of the inventor of the subject invention prior to the invention described and claimed herein. These compositions were prepared both with and without flow control additives. However, the preferable compositions were those prepared using a flow control additive which was made generally in accordance with the teaching of U.S. Pat. No. 4,147,688 to Makhlouf et al. That patent teaches stable crosslinked dispersions wherein crosslinked acrylic polymer microgel particles are formed by free radical addition polymerization of alpha, beta ethylenically unsaturated monocarboxylic acid, at least one other copolymerizable monoethylenically unsaturated monomer and a certain percentage of crosslinking monomer, in the presence of a hydrocarbon dispersing liquid (see abstract, examples and claims). Other crosslinked dispersions containing microgel particles are disclosed in the patent applications and patents referred to in the Makhlouf et al disclosure.

U.S. Pat. No. 4,025,474 to Porter et al discloses a polyester based coating composition which includes the crosslinked dispersions disclosed by Mahklouf et al. U.S. Pat. No. 4,074,141 to Porter et al disclose carboxylic acid amide interpolymer—based coating compositions including the same crosslinked dispersions. U.S. Pat. No. 4,115,472, also to Porter et al, discloses urethane coating compositions also including the crosslinked dispersions of Mahklouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with nonhydroxyl bearing monomers in the presence of the stabilizer disclosed by Mahklouf et al, and (c) melamine resin. The microgel dispersion of Sullivan et al thus contains functionality capable of reacting with the melamine crosslinking agent.

All of the stable crosslinked dispersions referred to above contain microgel particles and are of the dispersion type generally referred to in the art as nonaqueous dispersions. These nonaqueous dispersions have been developed in recent years in attempts to improve the efficiency of applying protective or decorative coatings to a variety of objects and have been particularly widely used in the coating of motor vehicle bodies and vehicle components. Those skilled in the art will be aware of numerous prior art references relating to nonaqueous dispersion technology. Among the more pertinent prior art references, insofar as this invention is concerned, in addition to the Makhlouf et al patent and the patents referred to therein, are those which have taught various improved stabilizers and methods of making the same. These include: U.S. Pat. Nos. 3,317,635 to Osmond et al; 3,514,500 to Osmond et al; 3,607,821 to Clarke; and 3,814,720 and 3,814,721, both to Maker et al.

U.S. Pat. No. 3,317,634 to Osmond et al teaches nonaqueous dispersions stabilized by block or graft copolymers of ethylenically unsaturated monomers with a precursor containing a polymeric chain and an unsaturated group with which the monomer polymerizes in vinyl-type manner to produce a polymeric vinyl chain of a different degree of polarity from the original polymeric chain (Col. 2, lines 1–9). Stable dispersions of synthetic monomers in organic liquids may be made in accordance with Osmond et al by precipitating the polymer in the organic liquid in the presence of the stabilizer such that one polymeric chain is solvated by the organic liquid and another is non-solvated and consequently becomes associated with the non-solvated polymer (Col. 2, lines 50–56).

U.S. Pat. No. 3,514,500 to Osmond et al teaches a stabilizer for nonaqueous dispersions, which stabilizer comprises a polymeric backbone and attached thereto at least five side chains of different polarity than the backbone (See abstract). The side chains are attached to the backbone by a condensation reaction between side chains containing only one reactive group per molecule and a backbone containing at least five complementary reactive groups per molecule (Col. 1, line 71-Col. 2, line 1).

U.S. Pat. No. 3,607,821 to Clarke teaches a stabilizer for nonaqueous dispersions wherein the stabilizer is chemically reacted with dispersed particles of the dispersion (Col. 1, lines 36–42). Each co-reacted stabilizer molecule forms from 1 to 10 (preferably 1 to 4) covalent links with the dispersed polymer (Col, 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

U.S. Pat. No. 3,814,720 assigned to Ford Motor Company, the assignee of this application, teaches nonaqueous dispersions which employ a methylolated addition copolymer of an ethenic monomer and an amide of an unsaturated acid (see abstract and claims).

U.S. Pat. No. 3,814,721, also to Maker et al and also assigned to Ford Motor Company, teaches nonaqueous dispersions which are prepared employing a precursor addition copolymer which is prepared by reacting an active ethenic monomer having a functional epoxy, hydroxy, cyanato, or carboxy group with another active ethenic monomer free of functional groups in an aromatic or alcoholic solvent, followed by addition of an aliphatic liquid in which the polymer is insoluble, followed still further by the addition of a third ethenic monomer having one of such functional groups and a forth ethenic monomer free of such functional groups, such that the aliphatic liquid is a non-solvent for the second addition copolymer which is dispersed throughout the medium (see abstract, examples and claims).

BRIEF DESCRIPTION OF THE INVENTION

This invention relates to coating compositions of the type comprising hydroxy functional film formers and a crosslinking agent bearing functionality capable of reacting with the hydroxyl groups of the film former. The improvement of the invention comprises including in the composition a flow control additive which comprises a stable, crosslinked dispersion containing microgel particles. The additive is included in an amount ranging from about 0.5 to about 30, preferably about 3 to about 15, parts of the resin solids in the flow control additive per 100 parts of total resin solids in the composition.

The flow control additive or stable, crosslinked dispersion is formed by addition polymerization of (a) first and second ethylenically unsaturated monomers each bearing functionality capable of crosslinking reaction with the other and (b) at least one other monoethylenically unsaturated monomer, in the presence of (I) organic liquid which is a solvent for the polymerizable monomers, but a non-solvent for the resultant polymer, and (II) a polymeric dispersion stabilizer.

The polymeric dispersion stabilizer employed in the preparation of the flow control additive of the invention comprises the reaction product of ethylenically unsaturated monomers (A) and copolymer reactant (B). The ethylenically unsaturated monomers (A) bear functionality capable of condensation reaction with complementary functionality of the copolymer reactant (B). Copolymer reactant (B) comprises a random copolymer of ethylenically unsaturated monomers, homopolymers of which would be substantially insoluble in the organic liquid used to form the crosslinked dispersion, ethylenically unsaturated monomers, homopolymers of which would be substantially soluble in the organic liquid used to form the crosslinked dispersion, and ethylenically unsaturated monomers bearing the complementary functionality capable of condensation reaction with the ethylenically unsaturated monomers (A). The polymeric dispersion stabilizer is prepared by reacting copolymer reactant (B) with ethylenically unsaturated monomers (A) in an amount sufficient to react at least about 10% of the complementary functionality of copolymer reactant (B). The flow control additive or crosslinked dispersion employed in compositions of the invention is prepared by carrying out the addition polymerization discussed above at an elevated temperature such that the dispersion polymer is first formed and then crosslinked.

The preferred improved intermediate solids coating compositions of the invention comprise: (I) a film forming component comprising hydroxy functional copolymer; (II) butylated melamine formaldehyde crosslinking agent; and (III) the above flow control additive.

The film forming component comprises hydroxy functional copolymer having a number average molecular weight ($M_n$) of greater than about 5,000 and a glass transition temperature of between about $-25°$ C. and about $70°$ C. the hydroxy functional copolymer being formed from about 5 to about 50 weight percent of hydroxy functional monoethylenically unsaturated monomers and a remainder of other monoethylenically unsaturated monomers.

The butylated melamine formaldehyde crosslinking agent has a number average molecular weight of between about 700 and about 2,500 and is included in the composition in an amount ranging from about 20 to about 100 parts per 100 parts of the film forming component.

The flow control additive is included in an amount ranging from about 0.5 to about 30, preferably from about 3 to about 15 parts of resin solids in the flow control additive per 100 parts of total resin solids in the composition.

The improved high solids coating compositions of the invention comprise: (I) a film forming component consisting essentially of a polymeric component having a molecular weight of less than about 5,000; (II) a crosslinking agent comprising monomeric methlated melamine resin; and (III) the above flow control additive.

The film forming component consists essentially of a polymeric component having a number average molecular weight of less than about 5,000, said polymeric component comprising at least about 50 percent by weight of hydroxy functional copolymer having a number average molecular weight of between about 1,500 and about 5,000 and a glass transition temperature of between about −25° C. and about 70° C. This hydroxy functional copolymer is formed from about 15 to about 35 weight percent of hydroxy functional monoethylenically unsaturated monomers, between about 2 and about 5 weight percent of alpha, beta olefinically unsaturated carboxylic acids and a remainder of other monoethylenically unsaturated monomers.

The crosslinking agent of the compositions of the invention comprises monomeric methylated melamine resin having a number average molecular weight of between about 350 and about 1,000 and is included in the composition in an amount ranging from about 20 to about 100 parts per 100 parts of the film forming component.

The flow control additive is included in an amount ranging from about 0.5 to about 30, preferably from about 3 to about 15, parts of resin solids in the flow control additive per 100 parts of total resin solids in the composition.

DETAILED DESCRIPTION OF THE INVENTION

The coating compositions of the invention comprise hydroxy functional film former, crosslinking agents bearing functionality capable of reacting with the hydroxy functional group of the film former and a flow control additive comprising a stable, crosslinked dispersion containing microgel particles. In addition the compositions of the invention may include conventional additives such as catalysts, anti-oxidants, UV absorbers, wetting agents, anti-static agents, pigments, plasticizers, solvents, etc.

Flow Control Additive

The flow control additve employed in compositions of the invention is a stable, crosslinked dispersion containing microgel particles and is incorporated in the compositions in an amount ranging from about 0.5 to about 30, preferably from about 3 to about 15, parts of resin solids in the flow control additive per 100 parts of total resin solids in the composition. As noted above, the flow control additve enhances the flowout characteristics of the compositions, thus promoting smoothness and evenness of film coat and is particularly advantageous in those instances wherein metallic pigment is incorporated in automotive topcoating enamels.

The stable crosslinked microgel dispersions employed as flow control additives in the compositions of the invention are prepared by addition polymerization of (a) first and second ethylenically unsaturated monomers, each bearing functionality capable of crosslinking reaction with the other, and (b) at least one other monoethylenically unsaturated monomer. The polymerization is done in the presence of an organic liquid which is a solvent for the polymerizable monomers, but a nonsolvent for the resultant polymer as is typically done in the preparation of nonaqueous dispersions. Also, as is done with nonaqueous dispersions, the polymerization takes place in the presence of a dispersion stabilizer.

The dispersion stabilizer employed in the preparation of the stable crosslinked dispersions employed as flow control additives in compositions of this invention is a novel polymeric dispersion stabilizer comprising the reaction product of ethylenically unsaturated monomers (A) and copolymer reactant (B). Ethylenically unsaturated monomers (A) bear functionality capable of condensation reaction with a complementary functionality of copolymer reactant (B). That copolymer reactant (B) comprises a random copolymer of (i) between about 20 and about 45, preferably between about 25 and about 40, weight percent of ethylenically unsaturated monomers, homopolymers of which would be substantially insoluble in said organic liquid, (ii) between about 40 and about 75, preferably between 50 and about 65, weight percent of ethylenically unsaturated monomers, homopolymers of which would be substantially soluble in the same organic liquid, and (iii) between about 2 and about 15, preferably between about 5 and about 10, weight percent of ethylenically unsaturated monomers bearing said complementary functionality capable of condensation reaction with the ethylenically unsaturated monomers (A). The ethylenically unsaturated monomers (A) are reacted with copolymer reactant (B) in an amount sufficient to react with at least about 10 percent of complementary functionality on the copolymer. The addition polymerization used to prepare the stable crosslinked dispersion flow control additive used in compositions in the invention in the presence of the organic liquid and the dispersion stabilizer is carried out at elevated temperatures such that the dispersion polymer is first formed and then crosslinked.

As used herein, "ethylenically unsaturated monomer" means any monomer which bears ethylenic unsaturation, including doubly unsaturated monomers (e.g., butadiene), and which is capable of polymerizing in a vinyl-type monomer.

Condensation reactions between ethylenically unsaturated monomers (A) and complementary functionality of random copolymer reactant (B), as provided by ethylenically unsaturated monomers (iii) used to prepare that copolymer reactant, may be selected from the numerous condensation reactions known to those skilled in the art. Common condensation reaction links are: ester links, especially those formed by ester interchange or reaction such as carboxyl/glycidyl, hydroxyl/acid anhydride or hydroxyl/acid chloride; ether links, especially when formed by addition reactions between alkylene oxides and hydroxyl groups; urethane links, especially those formed by reaction between isocyanate and hydroxyl; and amide links, especially when formed by amine/acid chloride reactions. By way of example, among the numerous condensation reaction complementary groups are: acid anhydride/hydroxyl; acid anhydride/amine; acid anhydride/mercaptan; epoxide/acid; epoxide/amine; isocyanate/hydroxyl; hemiformal/amide; carbonate/amine; cycloimide/amine; and cycloimide/hydroxyl. Among the numerous monomers which may provide the reactive groups either in the case of ethylenically unsaturated monomers (A) or ethylenically unsaturated monomers (iii) used to prepare random copolymer reactant (B) are: maleic anhydride; maleic acid; itaconic acid; acid esters of maleic and itaconic acids; glycidyl methacrylate; glycidyl acrylate; hydroxy alkyl methacrylates; hydroxy alkyl acrylates; acrylamide; methacrylamides; dimethyl aminoethyl methacrylates; vinylidene carbonate, N-carbamyl maleimide, vinylisocyanate, etc.

Random copolymer reactant (B) bears complementary functionality which reacts with functionality on ethylenically unsaturated monomers (A) to form the stabilizer copolymer. The random copolymer is formed from three types of monomers. The first type (i) comprises ethylenically unsaturated monomers characterized by the fact that if they were formed as homopolymers they would be substantially insoluble in a selected organic solvent, which in the case of the instant invention would be organic liquid or solvent used in preparation of the stable crosslinked dispersion. The second type of ethylenically unsaturated monomer (ii) employed in the preparation of the random copolymer reactant (B) is characterized by the fact that homopolymers thereof would be substantially soluble in the aforementioned organic liquid or solvent.

By "substantially soluble" or "substantially insoluble" in a selected organic liquid it is meant that the homopolymers in question would be either soluble or insoluble to the extent of about 90% in said selected organic liquid.

It will be appreciated that since the selected organic liquid used in determining the solubility and insolubility of the first two types of monomers used in the random copolymer is generally the same as the organic liquid in which the stable crosslinked dispersion of the invention is to be formed, the question of relative solubility and insolubility in the particular organic liquid will be determined by the same factors as are used as guidelines when determining which monomers and solvents are to be employed in the preparation of the stable crosslinked dispersion itself. To this end, it will be appreciated that there are essentially three types of systems or reasons why a given polymer, or in the case of the determination of monomers for the random copolymer, homopolymers, are either soluble or insoluble in a given organic liquid. First, the homopolymer may be soluble or insoluble because it is polar relative to the organic liquid. Secondly, it may be soluble or insoluble because it is non-polar relative to the organic liquid. Thirdly, it may be soluble or insoluble in all common organic liquids because of its molecular structure and irrespective of relative polarity. Thus, in selecting a monomer which is characterized in that homopolymers thereof would be substantially soluble or insoluble in a selected organic liquid, it is necessary to consider the type of organic liquid which is to be employed in making the determination of solubility or insolubility and to select a monomer which a when homopolymerized will exhibit the desired solubility or insolubility. The types of monomers, homopolymers of which will be soluble or insoluble in given types of organic liquids should be apparent to those skilled in the art of nonaqueous dispersions. For a thorough discussion of relative solubilities and insolubilities attention is directed to the above discussed prior art patents.

Generally speaking, when the organic liquid is of a non-polar nature, such as an aliphatic hydrocarbon, suitable monomers, homopolymers of which would be insoluble or substantially insoluble therein, include acrylic monomers selected from (a) esters of $C_1$–$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids. These are essentially polar monomers or monomers which form polar homopolymers which would be substantially insoluble in a non-polar solvent such as aliphatic hydrocarbon. Especially preferred for use as this first type of monomer which would be insoluble in an aliphatic hydrocarbon or other non-polar solvent is the polar monomer methylmethacrylate. Exemplary of suitable monomers for use as the second type of monomer characterized by being substantially soluble in a non-polar solvent such as an aliphatic hydrocarbon would be esters of $C_4$–$C_{18}$ aliphatic alcohols and acrylic, methacrylic, or ethacrylic acids. It will be appreciated that monomers characterized in that they would form homopolymers which are highly polar, could be used in more polar organic liquids such as aromatic hydrocarbons, fatty esters and fatty ketones and still be substantially insoluble therein. Those skilled in the art will appreciate the numerous selections which could be made.

If the organic liquid in which the crosslinked dispersion of the invention is to be prepared is one which is polar rather than non-polar, then the particular ethylenically unsaturated monomers selected for the first two types (i) and (ii) used in the preparation of random copolymer reactant (B) will differ. Among the numerous polar solvents which will come to the mind of those skilled in the art are various alcohols such as methanol and ethanol, glycols, esters, ethers, polyols and ketones. When using such polar organic liquid the first type of monomer (i) (that which is characterized by being substantially insoluble in the organic liquid) may be selected from numerous monomers which would be apparent to those skilled in the art. Among the long list are hydrocarbons are those such as styrene, vinyltoluene, divinylbenzene, isoprene, butadiene, isobutylene and ethylene. Also, of course the higher fatty esters of unsaturated acids such as acrylic, methacrylic and ethacrylic acids wherein the alcohol component of the ester contains a long carbon to carbon chain can be employed. Preferably these are esters of $C_4$–$C_{18}$ aliphatic alcohols and acrylic, methacrylic or ethacrylic acids. The polar monomers, or monomers homopolymers of which would be polar and therefore substantially soluble in such an organic liquid, would include numerous monomers including those acrylic monomers selected from (a) esters of $C_1$–$C_3$ aliphatic alcohols and acrylic, methacrylic or ethacrylic acids, (b) acrylic and methacrylic acids and (c) ethylene and propylene glycol monoesters of acrylic, methacrylic or ethacrylic acids.

While, as discussed above, numerous types of ethylenically unsaturated monomers may be employed in preparation of the stabilizer as any one of the monomers (A) or any of the three types of monomers (i), (ii) or (iii) used in the random copolymerization to form copolymer reactant (B) which reacts with monomers (A), it is preferred that such monomers be acrylic monomers. "Acrylic monomer" as used herein means a monomer based on acrylic, methacrylic or ethacrylic acids. In those cases where complementary functionality is desired for a reaction between monomers (A) and random copolymer reactant (B), the acid itself may, of course, be employed. Other types of acrylic monomers, which are commonly known to those skilled in the art and which are desirable for use in the preparation of the stabilizer of the invention, are the numerous well known esters of acrylic, methacrylic and ethacrylic acids.

Random copolymer reactant (B), used to prepare the polymeric dispersion stabilizer used in the compositions of the invention has a number average molecular weight in the range of between about 4,000 and about 15,000, preferably, from about 6,000 to about 10,000. While, ethylenically unsaturated monomers (A) are reacted with random copolymer reactant (B) in amounts sufficient to react with about 10 percent of said complementary functionality of copolymer reactant (B), it is preferred that the reactants be combined in amounts such that monomers (A) react with between about 0.05 to about 3.0 weight percent of copolymer reactant (B).

The flow control additive (i.e., the stable crosslinked dispersion of microgel particles) is prepared by addition polymerization of (a) between about 1 and about 10 mole percent, preferably between about 2 and about 5 mole percent, each of first and second ethylenically unsaturated monomers, each bearing functionality capable of crosslinking with the other and (b) between about 98 and about 80 mole percent, preferably between about 96 and about 90 mole percent of at least one other monoethylenically unsaturated monomer. The addition polymerization is carried out in the presence of an organic liquid which is a solvent for the polymerizable monomers, but a non-solvent for the resultant polymer and in the presence of the aforementioned polymeric dispersion stabilizer.

The crosslinking functionalities on the first and second ethylenically unsaturated monomers (a) can be selected from a wide variety of functionalities which will be apparent to those skilled in the art. Among the preferred pairs of crosslinking functionalities which may be present on the first and second ethylenically unsaturated monomers are: acid and epoxide; epoxide and amine; acid anhydride and hydroxyl; acid anhydride and amine; acid anhydride and mercaptan; isocyanate and hydroxyl; hemiformal and amide; carbonate and amine; cycloimide amine; cycloimide and hydroxyl; imine and alkoxysilane; etc.

While the first and second ethylenically unsaturated monomers (a) may be any ethylenically unsaturated monomer within the scope of such term as defined hereinbefore, it is preferred that the monomers be acrylic monomers as defined above.

A preferred class of crosslinked dispersions within the scope of the invention is formed by free radical addition copolymerization, in the presence of the polymeric dispersion stabilizer and in the presence of a hydrocarbon dispersing liquid, of: from about 1 to about 10, preferably from about 2 to about 5, mole percent of alpha, beta ethylenically unsaturated monocarboxylic acid; from about 98 to about 80 mole percent of at least one other copolymerizable monoethylenically unsaturated monomer; and from about 1 to about 10, preferably from about 2 to about 5, mole percent of a crosslinking monomer selected from the group consisting of ethylenically unsaturated monoepoxides. The perferred alpha, beta ethylenically unsaturated monocarboxylic acids for use in this class of crosslinked dispersions are acrylic acid and methacrylic acid, with methacrylic acid being especially preferred.

Various other monoethylenically unsaturated monomers may be copolymerized with the acid monomer in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having from about 1 to about 4 carbon atoms in the alkyl group. Illustrative of such compounds are the alkyl acrylates, such as methylacrylate, ethylacrylate, propylacrylate and butylacrylate and the alkyl methacrylates, such as methylmethacrylate, ethylmethacrylate, propylmethacrylate and butylmethacrylate. Other ethylenically unsaturated monomers which may be advantageously employed include, for example, the vinyl aromatic hydrocarbons, such as styrene, alpha-methylstyrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

Although numerous ethylenically unsaturated monoepoxides will come to the mind of those skilled in the art, representative of the most preferred monoepoxides for this class of crosslinked dispersion are glycidyl acrylate and glycidyl methacrylate.

In a particularly preferred crosslinked dispersion embodiment within the aforementioned class, the monomers used in the addition copolymerization to form the dispersed polymer are characterized in that the alpha, beta ethylenically unsaturated monocarboxylic acid is methacrylic acid, the other copolymerizable monoethylenically unsaturated monomer is methylmethacrylate and the crosslinking monomer is glycidyl methacrylate. In this particularly preferred crosslinked dispersion embodiment, the preferred polymeric dispersion stabilizer is one in which ethylenically unsaturated monomers (i) and (ii) used to prepare the copolymer reactant (B) precursor of the polymeric dispersion stabilizer are methylmethacrylate and 2-ethylhexylacrylate respectively, and in which one of the ethylenically unsaturated monomers (A) or (iii) of copolymer reactant (B) is glycidyl acrylate or glycidyl methacrylate and the other of said ethylenically unsaturated monomers (A) or (iii) is acrylic or methacrylic acid. Most preferred is the case wherein ethylenically unsaturated monomer (iii) of copolymer reactant (B) is glycidyl acrylate or glycidyl methacrylate and ethylenically unsaturated monomers (A) comprise acrylic or methacrylic acid.

Hydroxy Functional Film Forming Material

The film forming component of the compositions of the invention is a hydroxy functional material capable of crosslinking with a crosslinking agent having functionality thereon adapted to react with hydroxyl groups on the film former. As will be appreciated by those skilled in the art, there are numerous types of hydroxy functional film forming materials which may be crosslinked to form cured films on substrates. This film former may comprise one or more hydroxy functional polymers or copolymers as well as additional hydroxy functional monomeric materials if desired. Of course, additional film forming components, not bearing hydroxy functionality or bearing still other functionalities might also be included in the composition. These variations will be apparent to those skilled in the art.

Exemplary of the numerous hydroxy functional copolymers which may be employed as film formers in compositions to which the improvement of this invention applies are the various acrylic based copolymers, including particularly those which have number average molecular weights of at least 150 up to approximately 20,000 and glass transition temperatures ranging from between about −25° C. and about 70° C. Typically, such copolymers may include between about 5 and about 50 weight percent of monoethylenically unsaturated monomers bearing hydroxy functionality and between about 95 and about 50 weight percent of other monoethylenically unsaturated monomers. The hydroxy functional monomers provide the copolymer with its hydroxy functionality and are selected typically from hydroxy alkyl esters of monoethylenically unsaturated carboxylic acids. The list of such typical hydroxy functional monomers suitable for forming such copolymers is well known to those skilled in the art and could include, for example, 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxybutyl acrylate; 4-hydroxybutyl acrylate, diethyleneglycol acrylate; 5-hydroxypentyl acrylate, 6-hydroxyhexyl acrylate; triethyleneglycol acrylate; 7-hydroxyheptyl acrylate; 2-hydroxyethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate. Preferred hydroxy functional monomers in such compositions are often $C_5$-$C_7$ hydroxy alkyl acrylates and/or $C_6$-$C_8$ hydroxy alkyl methacrylates, i.e., esters of $C_2$-$C_3$ dihydric alcohols and acrylic or methacrylic acids.

The remainder of monomers forming the such hydroxy functional copolymers typically are other monoethylenically unsaturated monomers which preferably are alpha, beta olefinically unsaturated monomers, i.e., monomers bearing olefinic unsaturation between the two carbons in the alpha and beta positions with respect to the terminus of an aliphatic carbon to carbon chain. As is well known, among the numerous alpha-beta olefinically unsaturated monomers which might be employed in such copolymers are acrylates, as defined herein, as well as mixtures of acrylates and vinyl hydrocarbons. Generally is such compositions in excess of 50 weight percent of the total are esters of $C_1$-$C_{12}$ monohydric alcohols and acrylic or methacrylic acids. Among monovinyl hydrocarbons suitable for use in forming copolymers of this type are those containing 8 to 12 carbon atoms and including styrene, alpha methylstyrene, vinyl toluene, t-butylstyrene and chlorostyrene. Generally when monovinyl hydrocarbons are employed, they constitute less than 50 weight percent of the copolymer. Also, other monomers such as vinyl chloride, acrylonitrile, methacrylonitrile, and vinyl acetate may be included in these compositions as modifying monomers; however, these modifying monomers should constitute only between about 0 and about 40 weight percent of the monomers in the copolymer.

As mentioned above, one or more hydroxy functional polymers or copolymers could be employed as the film forming material. For example, it may be desirable to employ hydroxy functional copolymers of varying molecular weights. Also, it may be desirable to include other hydroxy functional materials of the monomeric nature which would serve as reactive diluents in the compositions. These are only a few of the numerous types of combinations and modifications of film forming materials which could be employed.

Examplary of the numerous types of compositions intended to be within the scope to which the improvement of this invention applies are compositions such as are disclosed and claimed in U.S. Ser. No. 945,027 filed Sept. 22, 1978 in the name of Chattha and the compositions which are disclosed and claimed in application Ser. No. 157,705, filed June 9, 1980, which is a continuation-in-part of U.S. Ser. Nos. 041,207 filed May 21, 1979 and 000,852 filed Jan. 4, 1979, as well as application Ser. No. 157,706 filed June 9, 1980, which is a continuation-in-part of U.S. Ser. Nos. 041,208 filed May 21, 1979 and 000,855 filed Jan. 4, 1979.

Crosslinking Agents

The other major conventional component of compositions to which the improvement of this invention is applicable is a crosslinking agent capable of reacting with the hydroxyl groups of the hydroxy functional film forming material to effect a cure of the composition. While it will be appreciated that the particular crosslinking agent is not critical to the invention and that many suitable materials may be selected, exemplary crosslinking agents are isocyanates and well known amino compounds.

Representative of isocyanate compounds useful as crosslinking agents in thermosetting coating compositions to which the improvements of the invention is applicable are polyisocyanates, i.e., compounds having two or more, preferably three or more, reactive isocyanate groups per molecule. These polyisocyanate crosslinking agents are included in compositions of the invention in amounts typically ranging from about 0.5 to about 1.6 isocyanate groups per hydroxyl group in the composition.

Polyisocyanates are well known in the art and numerous suitable isocyanates having two or more reactive isocyanate groups per molecule will be apparent to those skilled in the art. Among the many suitable polyisocyanates are aliphatic, cycloaliphatic and aromatic isocyanate compounds. Numerous representative polyisocyanate crosslinking agents are enumerated in the aforementioned application Ser. No. 157,705.

Amino crosslinking agents useful in compositions which the improvement of the invention may be applied are generally preferably condensation products of formaldehyde with melamine, substituted melamines, urea or substituted and unsubstituted benzoguanamine. Such multi functional amino compounds, which are widely used in the coating industry, may be used in monomeric, polymeric or a mixture of monomeric and polymeric forms. Numerous examples of such representative amino compounds are also set forth in application Ser. No. 157,705.

Preferred Intermediate Solids Composition

As discussed above, the preferred intermediate solids coating compositions of the invention comprise three primary components: (i) a film forming component comprising hydroxy functional copolymer; (ii) a butylated melamine formaldehyde crosslinking agent; and (iii) the flow control additive comprising a stable crosslinked dispersion as described above.

The film forming component of the intermediate solids composition comprises a hydroxy functional copolymer having a number average molecule weight ($M_n$) greater than about 5,000 and a glass transition temperature of between about −25° C. and about 70° C. This hydroxy functional copolymer is formed from between about 5 and about 50, preferably between about 10 and about 30 weight percent of hydroxy functional monoethylenically unsaturated monomers and a remainder of other monoethylenically unsaturated monomers.

While numerous hydroxy functional monoethylenically unsaturated monomers may be employed in the preparation of copolymers useful as a film forming component in the compositions of the invention, preferred monomers of this type are selected from the group consisting of hydroxy bearing aliphatic alcohol and esters of alpha, beta monoethylenically unsaturated carboxylic acids. Most preferably, the hydroxy functional monomers which provide the copolymer with its hydroxy functionality are selected from hydroxy alkyl esters of monoethylenically unsaturated carboxylic acids. Typical of such alpha, beta monoethylenically unsaturated carboxylic acids are acrylic, methacrylic and ethacrylic acids. Among the numerous hydroxy functional monomers in this preferred class of monomers suitable for preparing the copolymers of the film forming component of the intermediate solids compositions are those hydroxy functional monomers listed in the general description of the hydroxy functional film formers.

The remainder of other monoethylenically unsaturated monomers forming the hydroxy functional copolymer of the film forming component, i.e., between about 50 and about 95 weight percent, preferably between about 70 and about 90 weight percent, are preferably alpha-beta olefinically unsaturated monomers, i.e., monomers bearing olefinic unsaturation between the two carbon atoms in the alpha and beta positions with respect to the terminus of an aliphatic carbon to carbon chain.

In a preferred embodiment of the intermediate solids compositions, the remainder of other monoethylenically unsaturated monomers includes up to about 2 weight percent, based on the total weight of monomers used to prepare the hydroxy functional copolymer of an alpha, beta monoethylenically unsaturated carboxylic acid such as acrylic, methacrylic or ethacrylic acid.

The remainder of monoethylenically unsaturated monomers, other than the carboxylic acids discussed above, are preferably selected from acrylates (meaning esters of acrylic or methacrylic acids) as well as mixtures of acrylates and vinyl hydrocarbons. Preferably, in excess of 30 weight percent of the total copolymer monomers are esters of a $C_1$-$C_{12}$ monohydric alcohol and acrylic, methacrylic or ethacrylic acid, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming such copolymers are those containing 8 to 12 carbon atoms and including styrene, alpha methylstyrene, vinyl toluene, t-butylstyrene and chlorostyrene. When such monovinyl hydrocarbons are employed, they should constitute less than about 50 weight percent of the copolymer. Other modifying vinyl monomers may also be included in this remainder of monoethylenically unsaturated monomers. These vinyl monomers such as vinyl chloride, acrylonitrile, methacrylonitrile, vinyl acetate, etc. should constitute only between about 0 and about 40 weight percent of the monomers of the hydroxy functional copolymer.

In preparing such copolymers suitable for use as the hydroxy functional film former of the intermediate solids compositions, the hydroxy functional monomers and the remaining monoethylenically unsaturated monomers are mixed and reacted, typically by conventional free radical initiated polymerization, in such proportions as to obtain the copolymers desired. A large number of free radical initiators are known to those skilled in the art and are suitable for this purpose. Polymerization is preferably carried out in solution using a solvent in which the hydroxy functional copolymer is soluble. Numerous solvents will be apparent to those skilled in the art.

In addition to the above discussed hydroxy functional copolymer, the hydroxy functional component of the intermediate solids compositions may also include other hydroxy functional materials in lesser amounts (i.e. up to a total of 50 parts, preferably less than 35 parts, and generally, although not necessarily 10 parts or more, of other hydroxy functional materials per 100 parts of the total hydroxy functional component). For example, the coating composition may further comprise one or more hydroxy functional copolymers having a number average molecular weight ($M_n$) of between about 1,500 and about 5,000 and a glass transition temperature between about −25° C. and about 70° C. Such lower molecular weight hydroxy functional copolymers are generally formed from about 15 to about 35 weight percent, preferably from about 20 to about 30 weight percent, of hydroxy functional monoethylenicaly unsaturated monomers and a remainder of other monoethylenically unsaturated monomers. Suitable hydroxy functional and other monoethylenically unsaturated monomers are similar to those discussed above with respect to the higher molecular weight hydroxy functional copolymers.

The hydroxy functional film forming component of the intermediate solids coating compositions of the invention may also include, for example, one or more hydroxy functional oligoesters in an amount ranging from about 5 to about 50, preferably from about 10 to about 35, weight percent of the hydroxy functional film former. These suitable oligoesters are those described in U.S. patent application Ser. No. 157,705 filed June 9, 1980 and include those (i) having a number average molecular weight ($M_n$) of between about 150 and about 3,000, (ii) bearing at least two hydroxyl groups per molecule, and (iii) being selected from the group consisting of: (a) esterification reaction products of polycarboxylic acids and monoepoxides; (b) esterification reaction products of polyepoxides and monocarboxylic acids, preferably monocarboxylic acids containing no ethylenic unsaturation and bearing no hydroxy functionality; (c) esterification reaction products of hydroxy functional carboxylic acids and mono- or polyepoxides, preferably monoepoxides; (d) esterification reaction products of monocarboxylic acids and hydroxy functional mono- or polyepoxides, preferably monoepoxides; and (e) mixtures of (a)-(d).

Still other hydroxy functional materials which will be apparent to those skilled in the art may be included in minor amounts.

The intermediate solids compositions of the invention comprise between about 20 and about 100, preferably between about 30 and about 80, parts per 100 parts of said film forming component of butylated melamine formaldehyde crosslinking agent having a number average molecular weight of between about 700 and about 2,500.

Suitable butylated melamine formaldehyde resins are those prepared by condensation of melamine, formaldehyde and butyl alcohol either in a one-step process under acidic conditions or in a two-step process in which the melamine and formaldehyde are reacted under basic conditions followed by etherification under acidic conditions. The molecular weight is governed by the ratios of the three components. High ratios of formaldehyde to melamine and high ratios of alcohol to formaldehyde tend to yield lower molecular weight resins. The molar ratio of formaldehyde to melamine ranges from 3.0 to 6, while the molar ratio of butanol to melamine may range from 6 to 12. Only a portion of the alcohols react and the remainder acts as a solvent. Molecular weight distributions are generally wide with the $M_w$ range from about 2,000 to about 10,000 and the $M_n$ ranging as stated above.

Preferred High Solids Composition

As discussed above, the preferred high solids coating compositions of the invention comprise three primary components: (i) a film forming component consisting essentially of a polymeric component having a number average molecular weight of less than about 5,000; (ii) a crosslinking agent comprising monomeric methylated melamine resin; and (iii) the flow control additive comprising a stable crosslinked dispersion as described above.

The film forming component of the high solids compositions consists essentially of a polymeric component having a number average molecular weight of less than about 5,000. The polymeric component comprises at least about 50 percent by weight of hydroxy functional copolymer having a number average molecule weight ($M_n$) of between about 1,500 and about 5,000 and a glass transition temperature of between about $-25°$ C. and about $70°$ C. This hydroxy functional copolymer is formed from between about 15 and about 35, preferably between about 20 and about 30, weight percent of hydroxy functional monoethylenically unsaturated monomers, between about 2 and about 5 weight percent of alpha, beta olefinically unsaturated carboxylic acids and a remainder of other monoethylenically unsaturated monomers.

While numerous hydroxy functional monoethylenically unsaturated monomers may be employed in the preparation of copolymers useful as a film forming component in the compositions of the invention, preferred monomers of this type are those described above in the description of the preferred intermediate solids compositions of the invention.

In the preferred hydroxy functional copolymers useful in the high solids compositions of the invention, the alpha, beta olefinically unsaturated carboxylic acids in the monomer mix used to make the hydroxy functional copolymer are included in a amount ranging from about 2 to about 4 weight percent and are selected from acrylic, methacrylic and ethacrylic acids. It will be appreciated that other alpha, beta olefinically unsaturated carboxylic acids may also be employed.

The remainder of other monoethylenically unsaturated monomers forming the hydroxy functional copolymer of the film forming component, i.e., between about 60 and about 83 weight percent, preferably between about 65 and about 78 weight percent, are preferably alpha-beta olefinically unsaturated monomers, i.e., monomers bearing olefinic unsaturation between the two carbon atoms in the alpha and beta positions with respect to the terminus of an aliphatic carbon to carbon chain.

The remainder of monoethylenically unsaturated monomers are preferably selected from acrylates (meaning esters of acrylic or methacrylic acids) as well as mixtures of acrylates and vinyl hydrocarbons. Preferably, in excess of 30 weight percent of the total copolymer monomers are esters of a $C_1$–$C_{12}$ monohydric alcohol and acrylic, methacrylic or ethacrylic acid, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming such copolymers are those containing 8 to 12 carbon atoms and including styrene, alpha methylstyrene, vinyl toluene, t-butylstyrene and chlorostyrene. When such monovinyl hydrocarbons are employed, they should constitute less than about 50 weight percent of the copolymer. Other modifying vinyl monomers may also be included in this remainder of monoethylenically unsaturated monomers. These vinyl monomers such as vinyl chloride, acrylonitrile, methacrylonitrile, vinyl acetate, etc. should constitute only between about 0 and about 40 weight percent of the monomers of the hydroxy functional copolymer.

In preparing such copolymers suitable for use in the polymeric component of the film forming component of the high solids compositions of the invention, the hydroxy functional monomers and the remaining monoethylenically unsaturated monomers are mixed and reacted, typically by conventional free radical initiated polymerization in the manner discussed above.

In addition to the above discussed hydroxy functional copolymer, other hydroxy functional polymeric materials may be employed in the polymeric component or film forming component of the compositions of the invention. Such other hydroxy functional polymeric materials will of course be included in lesser amounts (i.e. up to a total of about 50 parts, preferably less than about 30 parts, of such other hydroxy functional materials per 100 parts of the polymeric component of the film forming component of the compositions). For example, the polymeric component may further comprise one or more hydroxy functional oligoesters as discussed above.

Still other hydroxy functional materials which will be apparent to those skilled in the art may be included in minor amounts in the polymeric component of the film forming component of the high solids compositions of the invention. Still further, minor amounts (i.e., up to about 25 parts, preferably less than about 10 parts, per 100 parts of the polymeric component) of other polymeric materials bearing no hydroxy functionality or other functionalities which do not interfere with the crosslinking reaction between the hydroxy functional materials and the crosslinking agent, may be employed.

The high solids coating compositions of the invention include between about 20 and about 100 parts, preferably between about 40 and about 80 parts per 100 parts of the film forming component of a crosslinking agent comprising monomeric methylated melamine resin having a number average molecular weight of between about 350 and about 1,000. Monomeric methylated melamine resins are prepared by the co-condensation of melamine, formaldehyde and methyl alcohol, usually in a two-step procedure. In order to maximize the amount of monomeric structure, the ratio of condensed formaldehyde to melamine is high, usually greater than 5 to 1 and more preferably greater than 5.5 to 1. The melamine formaldehyde condensation is usually done under basic conditions. The etherification is then accomplished under acidic conditions with excess amounts of methanol to maximize the etherification and minimize condensation reactions that lead to dimers, trimers, etc.

EXAMPLES 2-7

Following the procedure of Example 1, a variety of stabilizers of various kind and ratio of monomers was prepared. Table I summarizes the monomers ratio and properties of some typical stabilizers.

TABLE I

| Example | $M_1$ Non Polar Monomer | $M_2$ Polar Monomer | $M_3$ Functional Monomer | $M_4$ Complementary Unsaturated Monomer | Ratio of $M_1/M_2/M_3/M_4$ | Gardner Viscosity | Solids Content |
|---------|-------------------------|---------------------|--------------------------|-----------------------------------------|----------------------------|-------------------|----------------|
| 2 | EHA | MMA | GMA | MAA | 54/40/6/1 | S | 58.3% |
| 3 | EHA | MMA | GMA | MAA | 59/35/6/2 | T | 59.1% |
| 4 | EHA | MMA | GMA | MAA | 59/35/6/1 | — | 57.1% |
| 5 | EHA | MMA | GMA | MAA | 65/25/10/0.8 | G-H | 53.7% |
| 6 | LA | MMA | GMA | MAA | 65/25/10/1.0 | D | 49.3% |
| 7 | EHA | MMA | GMA | MMA | 64/30/6/1 | N | 57.2% |

Notes:
The following abbreviations are used:
EHA = 2-Ethylhexylacrylate;
MMA = Methyl Methacrylate;
GMA = Glycidyl Methacrylate;
MAA = Methacrylic Acid;
LA = Lauryl acrylate The ratios of methanol to melamine may range from 8 to 30 in this reaction step. Molecular weight ranges for this type of crosslinking material are between about 450 and 1,500 for weight average molecular weight and between about 350 and 1,000 as indicated above for number average molecular weight. The ratios of condensed methanol to melamine ranges from about 4.8 to about 6.

The high solids compositions of the invention also may include up to about 50, preferably up to about 30, weight percent, based on the total weight of crosslinking agent, of a butylated melamine formaldehyde crosslinking agent of the type described above in connection with the preferred intermediate solids compositions of the invention.

The invention will be more fully understood from the following detailed examples which are merely exemplary of the multitude of compositions which fall within the scope of the invention.

EXAMPLE I

A 2-liter flask equipped with a stirrer, thermometer, dropping funnel, and water condenser was charged with 590 grams n-butyl acetate and 0.4 gram t-butyl perbenzoate initiator. The initiator solution was heated to 120° C. While maintaining the temperature at 120° C., a mixture of 496 grams 2-ethylhexyl acrylate, 224 grams methyl methacrylate, 80 grams glycidyl methacrylate, and 4.2 grams t-butyl peroctoate was added dropwise over a period of 3 hours. One hour after the addition, a mixture of 0.84 grams t-butyl peroctoate and 25 grams n-butyl acetate was added and the reaction was allowed to continue for an additional 2 hours. Then a mixture of 1.28 grams hydroquinone, 6.4 grams methacrylic acid, 1.2 grams dimethyl dodecylamine, and 140 grams of n-butyl acetate was added to the reaction mixture. The reaction was held at 120° C. until the acid number was 0.2 mg KOH/gram. The reaction product was a darkly colored solution having a solids content of 50.6%, a Gardner viscosity of F, a number average molecular weight of 8545, and a weight average molecular weight of 28,865 determined by gel permeation chromatography using polystyrene calibration.

EXAMPLE 8

A nonaqueous acrylic dispersion polymer was prepared by heating to 90° C. 991 grams heptane, 41 grams methyl methacrylate, 8 grams of stabilizer from Example 5, and 0.7 gram azobis (isobutyronitrile) in a 5-liter flask which was equipped with a stirrer, thermometer, addition funnel, and water condenser. The reaction was held at 90° C. for 30 minutes; then a mixture of 1022 grams methyl methacrylate, 55 grams glycidyl methacrylate, 34 grams methacrylic acid, 3.4 grams dimethyl dodecylamine, 152 grams of stabilizer from Example 5, 427 grams Espesol 260H[(a)] and 7.7 grams azobis (isobutyronitrile) was added dropwise over a period of 4 hours. One hour after the addition, 0.77 gram azobis (isobutyronitrile) dissolved in 150 grams n-butyl acetate was added. The reaction was allowed to continue for an additional 2 hours. The resulting milky white acrylic dispersion polymer has a solids content of 43.0% and a Ford No. 2 Cup viscosity of 28.9 seconds.

[(a)]Espesol 260H is an aliphatic hydrocarbon solvent mixture with a boiling point range of 262°-284° F., a specific gravity of 0.731, a kB value of 30 and an aromatic content of about 5 percent. It is manufactured by Charter Chemical Co. of Houston, Tex.

EXAMPLE 9

Using the procedure of Example 8, an acrylic dispersion polymer was prepared using the stabilizer of Example 6. The resulting dispersion has a solids content of 43.5% and a Ford No. 2 Cup viscosity of 26.3 seconds.

EXAMPLE 10

(A) Flow Control Additive I

An acrylic stabilizer copolymer with a composition of 55/35/10/0.8 2-ethylhexyl acrylate/methyl methacrylate/glycidyl methacrylate/methacrylic acid was prepared. The copolymer had a I viscosity (Gardner-Holdt) at 50% solids in n-butyl acetate.

A flow control additive was prepared according to the procedure of Example 8 in which 1063 parts of methyl methacrylate, 55 parts of glycidyl methacrylate and 34 parts of methacrylic acid are reacted in the presence of 57 parts of the acrylic stabilizer solution. The additive had a solids content of 43% in 60/25/15 heptane/VM&P Naphtha/butyl acetate.

(B) Silver Metallic Enamel

A silver metallic enamel was prepared by mixing the following ingredients.

| | |
|---|---|
| Acrylic Resin A(a) | 2166 |
| Acrylic Resin B(b) | 1634 |
| Melamine Resin X(c) | 1509 |
| Flow Control Additive I | 640 |
| Aluminum paste (60% aluminum flake) | 175 |
| Polybutyl acrylate (60% in xylene) | 31 |
| Isobutyl acetate | 1000 |
| Ethylene glycol ethyl ether acetate | 745 |

The enamel was sprayed on a primed steel panel and cured for 17 minutes at 265° C. in a forced air oven. The panel had excellent brilliance and distinctness of image due to the even distribution of aluminum flake in the paint. A control enamel with no flow control additive appeared much darker and showed an uneven distribution of aluminum flake or mottling.

(a) Acrylic Resin A is a typical automotive thermoset acrylic resin with a monomeric composition of 37/20/27/15/1 styrene/methyl methacrylate/butyl acrylate/hydroxypropyl methacrylate/acrylic acid. The resin has Y viscosity when cut to 55% solids in 70/12/18 cellosolve acetate/butanol/toluene.

(b) Acrylic Resin B is an automotive thermoset acrylic resin with a 30/30/20/19/1 styrene/butyl methacrylate/2-ethylhexyl/acrylate/hydroxypropyl methacrylate/acrylic acid composition. The resin had a T viscosity at 50% nonvolatiles in 50/50 cellosolve acetate/isopropyl acetate.

(c) Melamine Resin X is a butylated melamine resin with a U viscosity at 65% nonvolatiles in 2/1 butyl acetate/butyl alcohol and a ASTM D1198 mineral spirits tolerance of 300.

EXAMPLE 11

A white enamel was prepared by mixing the following ingredients.

| | |
|---|---|
| Titanium Dioxide Millbase(d) | 2891 |
| Acrylic Resin C(e) | 1241 |
| Acrylic Resin D(f) | 1099 |
| Melamine Resin X (same as in Ex. 10) | 1261 |
| Polybutyl acrylate (60% in xylene) | 25 |
| Isobutyl acetate | 2276 |
| Ethylene glycol monoethyl ether acetate | 558 |
| Flow Control Additive I | 133 |

A primed panel was sprayed so that a film thickness wedge of 1.7 mils to 3.5 mils was realized after the panel was baked for 17 minutes at 265° F. Sagging of the film began at the 2.5 mil thickness region. A control enamel which did not contain the flow control additive sagged at about 1.9 mils.

(d) The Millbase was prepared from:

| | | |
|---|---|---|
| Titanium dioxide | 600 | parts |
| Acrylic Resin D | 250 | parts |
| VM&P Naptha | 110 | parts |
| Methyl Amyl Ketone | 50 | parts |
| Butyl Acetate | 40 | parts |
| Toluene | 40 | parts |
| Xylene | 8 | parts |

(e) Acrylic Resin C is an acrylic copolymer of 30/30/20/18/2 styrene/butyl methacrylate/2-ethylhexyl acrylate/hydroxypropyl methacrylate/acrylic acid. The resin had a Z viscosity at 50% solids in xylene.

(f) Acrylic Resin D is an acrylic copolymer of 28/30/20/20/2 styrene/butyl methacrylate/ethylhexyl acrylate/hydroxypropyl methacrylate/acrylic acid. The resin had a T viscosity at 60% solids in 1/1 methyl amyl ketone/VM&P Naptha.

EXAMPLE 12

(A) Flow Control Additive II

An acrylic stabilizer with a comonomer composition of 59/35/6/1 ethylhexyl acrylate/methyl methacrylate/glycidyl methacrylate/methacrylic acid was prepared according to the procedure of Example 1. The copolymer had an L viscosity at 58% solids in butyl acetate. A flow control additive was prepared from:

1016 gms. of methyl methacrylate
52 gms. of glycidyl methacrylate
32 gms. of methacrylic acid
186 gms. of acrylic stabilizer
8.8 gms. of azobisisobutyronitrile
3.2 gms. of dimethyl dodecanoic amine
7.4 gms. of octyl melcaptan
930 gms. of heptane
394 gms. of VM&P Naptha
134 gms. of butyl acetate according to the procedure of Example 8. The dispersion had a % nonvolatiles of 43% and a No. 2 Ford Cup viscosity of 29.1 seconds.

(B) Silver Metallic High Solids Enamel

A silver metallic enamel was prepared by mixing the following ingredients:

| | |
|---|---|
| Acrylic Resin R(g) | 3475 |
| Cymel 325(h) | 1799 |
| RG-82(i) | 360 |
| Flow Control Additive II | 700 |
| (6.5% solids/total solids) | |
| Aluminum Flake dispersion (60% Al) | 205 |
| Methyl Ethyl Ketone | 209 |
| Ethylene glycol ethyl ether acetate | 767 |
| Isopropyl alcohol | 330 |
| Ethyl acetate | 250 |
| Diethylene glycol monobutyl ether | 160 |

The enamel was sprayed on a primed metal panel to yield a film with a wedged film thickness of 1.5 to 3.0 after baking at 285° F. for 20 minutes. The paint sagged at the 2.0 mil film thickness and higher. When the paint formula was adjusted to contain 7.5% of the flow control additive, the sag resistance improved to 2.2 mils. Similar paint with no flow control additive sagged at less than 1.0 mil film thickness.

(g) Acrylic Resin E is a 25/23/20/30/2 styrene/butyl methacrylate/ethylhexyl acrylate/hydroxyethyl acrylate/acrylic acid copolymer which has a Z3 viscosity at 78% NV in methyl amyl ketone.

(h) Cymel 325 is a methylated melamine-formaldehyde resin available at 80% NV from American Cyanamid Company.

(i) RG-82 is a product of Eastman Chemical Products, Inc. and is described as a reactive diluent with a hydroxyl equivalent weight of 91.

In view of this disclosure, many modifications of this invention will be apparent to those skilled in the art. It is intended that all such modifications which fall within the true scope of this invention be included within the terms of the appended claims.

What is claimed is:

1. A coating composition comprising:
   (I) a film forming component comprising hydroxy functional copolymer having a number average molecular weight ($M_n$) of from greater than about 150 up to about 20,000 and a glass transition temperature ($T_g$) ranging from between about −25° C. and about 70° C., said copolymer being formed from about 5 to about 50 weight percent of hydroxy functional monoethylenically unsaturated monomers and between about 95 and about 50 weight percent of other monoethylenically unsaturated monomers;
   (II) crosslinking agent selected from amino compounds and isocyanate compounds; and
   (III) A flow control additive in an amount ranging from about 0.5 to about 30 parts of resin solids in said flow control additive per 100 parts of total resin solids in said composition, said flow control additive comprising a stable, crosslinked dispersion containing microgel particles, said dispersion being formed by addition polymerization of
   (a) between about 1 and about 10 mole percent each of first and second ethylencially unsaturated monomers each bearing functionality capable of crosslinking reaction with the other and
   (b) between about 98 and about 80 mole percent of at least one other monoethylenically unsaturated monomer in the presence of: (I) an organic liquid which is a solvent for the polymerizable monomers, but a non-solvent for the resultant polymer, and (II) polymeric dispersion stabilizer comprising the reaction product of ethylenically unsaturated monomers (A) and copolymer reactant (B),
   said ethylenically unsaturated monomers (A) bearing functionality capable of condensation reaction with complementary functionality of said copolymer reactant (B) which comprises a random copolymer of
   (i) between about 20 and about 45 weight percent of ethylenically unsaturated monomers, homopolymers of which would be substantially insoluble in said organic liquid,
   (ii) between 40 and about 75 weight percent of ethylenically unsaturated monomers, homopolymers of which would be substantially soluble in said organic liquid; and
   (iii) between about 2 and about 15 weight percent of ethylenically unsaturated monomers bearing said complementary functionality capable of condensation reaction with said ethylenically unsaturated monomers (A),
   said ethylenically unsaturated monomers (A) being reacted with said copolymer reactant (B) in an amount sufficient to react with at least about 10 percent of said complementary functionality of said copolymer reactant (B), wherein said addition polymerization is carried out at elevated temperature such that the dispersion polymer is first formed and then crosslinked.

2. A coating composition in accordance with claim 1 wherein
   said hydroxy functional copolymer has a number average molecular weight ($M_n$) of greater than about 5,000 and
   said crosslinking agent comprises between about 20 and about 100 parts per 100 parts of said film forming component of butylated melamine formaldehyde having a number average molecular weight ($M_n$) of between about 700 and about 2,500.

3. A coating compositions in accordance with claim 1 wherein
   said film forming component consists essentially of a polymeric component having a number average molecular weight of less than about 5,000, said polymeric component comprising at least about 50 percent by weight of hydroxy functional copolymer having a number average molecular weight ($M_n$) of between about 1,500 and about 5,000 and a glass transition temperature of between about −25° C. and about 70° C., said hydroxy functional copolymer being formed from about 15 to about 35 weight percent of hydroxy functional monoethylenically unsaturated monomers, between about 2 and 5 weight percent of alpha, beta olefinically unsaturated carboxylic acids and a remainder of other monoethylenically unsaturated monomers, and
   said crosslinking agent comprises between about 20 and about 100 parts per 100 parts of said film forming component of monomeric methylated melamine resin having a number average molecular weight of between about 350 and about 1,000.

4. A coating composition in accordance with claim 1, 2 or 3 wherein said random copolymer reactant (B) employed in preparation of said polymeric dispersion stabilizer of said flow control additive is prepared from ethylenically unsaturated monomers (i) and (ii) which are selected such that homopolymers thereof would be substantially soluble or insoluble in said organic liquid as a result of relative polarities of said homopolymers and said organic liquid.

5. A coating composition in accordance with claim 4, wherein said organic liquid of said flow control additive is a polar solvent.

6. A coating composition in accordance with claim 4, wherein said organic liquid of said flow control additive is a non-polar solvent.

7. A coating composition in accordance with claim 1, 2 or 3 wherein at least a portion of said ethylenically unsaturated monomers (i), (ii), and (iii) used in preparation of said copolymer reactant (B) and at least a portion of said ethylenically unsaturated monomers (A) which are reacted with said copolymer reactant (B) to form said polymeric dispersion stabilizer, comprise acrylic monomers.

8. A coating composition in accordance with claim 7, wherein said copolymer reactant (B) used in preparation of said polymeric dispersion stabilizer of said flow control additive is characterized in that one of said ethylenically unsaturated monomers (i) or (ii) comprises an ester of a $C_4$–$C_{18}$ aliphatic alcohol and acrylic, methacrylic or ethacrylic acid, and the other of said ethylenically unsaturated monomers (i) or (ii) comprises an acrylic monomer selected from (a) esters of $C_1$–$C_3$ aliphatic alcohols and acrylic, methacrylic or ethacrylic acids, (b) arcylic and methacrylic acids, and (c) ethylene and propylene glycol monoesters of acrylic, methacrylic or ethacrylic acids.

9. A coating composition in accordance with claim 8, wherein said organic liquid of said flow control additive comprises aliphatic hydrocarbon and said copolymer reactant (B) used in preparation of said polymeric dispersion stabilizer of said flow control additive is characterized in that said ethylenically unsaturated monomer (i) is methylmethacrylate, and said ethylenically unsaturated monomer (ii) is 2-ethylhexylacrylate.

10. A coating composition in accordance with claim 9, wherein said polymeric dispersion stabilizer of said flow control additive is characterized in that one of said ethylenically unsaturated monomers (A) or (iii) is glycidyl acrylate or methacrylate and the other of said ethylenically unsaturated monomers (A) or (iii) is acrylic or methacrylic acid.

11. A coating composition in accordance with claim 4, wherein said polymeric dispersion stabilizer of said flow control additive is characterized in that said complementary functionalities on said ethylenically unsaturated monomers (A) and said ethylenically unsaturated monomers (iii) are selected such that they react to form linkages selected from the group consisting of esters, ethers, amides and urethanes.

12. A coating composition in accordance with claim 11, wherein said polymeric dispersion stabilizer is characterized in that said linkage is an ester formed by reaction of epoxide with acid.

13. A coating composition in accordance with claim 4, wherein the functionalities of said first and second ethylenically unsaturated monomers (a) used to form said dispersed polymer of said flow control additive respectively are selected from the group consisting of: (a) acid and epoxide; (b) epoxide and amine; (c) acid anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

14. A coating composition in accordance with claim 13, wherein said organic liquid of said flow control additive is an aliphatic hydrocarbon solvent and said first and second ethylenically unsaturated monomers (a) and said at least one other ethylenically unsaturated monomer (b) used in the preparation of said dispersed polymer of said flow control additive are acrylic monomers.

15. A coating composition in accordance with claim 13, wherein the dispersion of said flow control additive is formed by free radical addition copolymerization, in the presence of hydrocarbon dispersing liquid, of from about 1 to about 10 weight percent of alpha, beta-ethylenically unsaturated monocarboxylic acid, from about 98 to about 80 mole percent of at least one other copolymerizable monoethylenically unsaturated monomer and from about 1 to about 10 weight percent of crosslinking monomer selected from the group consisting of ethylenically unsaturated monoepoxides.

16. A coating composition in accordance with claim 15, wherein said monomers used in the addition copolymerization to form the dispersed polymer of said flow control additive are characterized in that said alpha, beta ethylenically unsaturated monocarboxylic acid is methacrylic acid, said other copolymerizable monoethylenically unsaturated monomer is methylmethacrylate and said crosslinking monomer is glycidylmethacrylate.

17. A coating composition in accordance with claim 15, wherein said monomers used in the preparation of the dispersed polymer of said flow control additive are characterized in that said alpha, beta ethylenically unsaturated monocarboxylic acid is acrylic acid or methacrylic acid.

18. A coating composition in accordance with claim 15, wherein said monomers used in the preparation of the dispersed polymer of said flow control additive are characterized in that said other copolymerizable monoethylenically unsaturated monomers are alkylacrylates or alkylmethacrylates.

19. A coating composition in accordance with claim 15, wherein said monomers used in the preparation of the dispersed polymer of said flow control additive are characterized in that said other copolymerizable monoethylenically unsaturated monomer is methylmethacrylate.

20. A coating composition in accordance with claim 19, wherein said ethylenically unsaturated monoepoxide comprises glycidylmethacrylate.

21. A coating composition in accordance with claim 2 or 3 wherein said hydroxy functional monoethylenically unsaturated monomers from which said hydroxy functional copolymer is prepared are selected from the group consisting of hydroxy bearing aliphatic alcohol esters of alpha, beta monoethylenically unsaturated carboxylic acids.

22. A coating composition in accordance with claim 21, wherein said alpha, beta olefinically unsaturated carboxylic acids are selected from acrylic, methacrylic and ethacrylic acids.

23. A coating composition in accordance with claim 2, wherein said other monoethylenically unsaturated monomers are monomers bearing alpha, beta olefinic unsaturation.

24. A coating composition in accordance with claim 23, wherein said other monoethylenically unsaturated monomers include up to 2 weight percent, based on the total weight of monomers used to prepare said hydroxy functional copolymer, of alpha, beta monoethylenically unsaturated carboxylic acid.

25. A coating composition in accordance with claim 24, wherein said carboxylic acid is selected from the group consisting of acrylic, methacrylic and ethacrylic acids.

26. A coating composition in accordance with claim 24, wherein said other monoethylenically unsaturated monomers, other than said carboxylic acid, are selected from the group consisting of acrylates, methacrylates, monovinyl hydrocarbons having between 8 and 12 carbon atoms and other modifying vinyl monomers.

27. A coating composition in accordance with claim 24, wherein said other monoethylenically unsaturated monomers, other than said carboxylic acid, consist essentially of esters of $C_1$–$C_8$ monoalcohols and acrylic and methacrylic acids.

28. A coating composition in accordance with claim 24, wherein said hydroxy functional copolymer is formed from said between about 15 and about 20 weight percent of said hydroxy functional monoethylenically unsaturated monomers.

29. A coating composition in accordance with claim 24, wherein said butylated melamine crosslinking agent comprises the reaction product of butyl alcohol, melamine and formaldehyde.

30. A coating composition in accordance with claim 2, wherein (a) said hydroxy functional copolymer is formed from about 10 to about 30 weight percent of hydroxyl bearing aliphatic alcohol esters of acrylic and methacrylic acids and a remainder of other monoethylenically unsaturated monomers, including up to 2 weight percent based on the total weight percent of monomers used to form said copolymer of acrylic or methacrylic acid, said remainder, other than said acrylic or methacrylic acids, being selected from the group consisting of acrylates, methacrylates, monovinyl hydrocarbons having between 8 and 12 carbon atoms and other modifying vinyl monomers; and (b) said butylated melamine crosslinking agent comprises the reaction product of butyl alcohol, melamine and formaldehyde.

31. A coating composition in accordance with claim 2 wherein said film forming of component comprises between about 50 and about 90 weight percent of said hydroxy functional copolymer having a number average molecular weight ($M_n$) of greater than about 5,000 and between about 10 and about 50 weight percent of at least one hydroxy functional copolymer having a number average molecular weight ($M_n$) of between about 1,500 and about 5,000 and a glass transition temperature of between about −25° C. and about 70° C., said hydroxy functional copolymers being formed from about 15 to about 35 weight percent of hydroxy functional monoethylenically unsaturated monomers, and a remainder of other monoethylenically unsaturated monomers.

32. A coating composition in accordance with claim 3, wherein said alpha, beta olefinically unsaturated carboxylic acids employed in the formation of said hydroxy functional copolymer are employed in amounts ranging from about 2 to about 4 weight percent.

33. A coating composition in accordance with claim 3, wherein said remainder of other monoethylenically unsaturated monomers are monomers bearing alpha, beta olefinic unsaturation.

34. A coating composition in accordance with claim 33, wherein said remainder of monoethylenically unsaturated monomers, is selected from the group consisting of acrylates, methacrylates, monovinyl hydrocarbons having between 8 and 12 carbon atoms and other modifying vinyl monomers.

35. A coating composition in accordance with claim 34, wherein said remainder of monoethylenically unsaturated monomers, consist essentially of esters of $C_1$-$C_8$ monoalcohols and acrylic and methacrylic acids.

36. A coating composition in accordance with claim 35, wherein said hydroxy functional copolymer has a number average molecular weight in the range of between about 2,300 and about 3,600 and is formed from between about 20 and about 30 weight percent of said hydroxy functional monoethylenically unsaturated monomers.

37. A coating composition in accordance with claim 34, wherein said crosslinking agent includes up to about 30 weight percent based on the total of said crosslinking agent of a butylated melamine formaldehyde crosslinking agent having a number average molecular weight of between about 700 and about 2,500.

38. A coating composition in accordance with claim 37, wherein said butylated melamine comprises the reaction product of butyl alcohol, melamine and formaldehyde.

39. A coating composition in accordance with claim 32, wherein said methylated melamine comprises a cocondensation reaction product of melamine, formaldehyde and methyl alcohol.

40. A coating composition in accordance with claim 3, wherein (a) said hydroxy functional copolymer is formed from about 20 to about 30 weight percent of hydroxyl bearing aliphatic alcohol esters of acrylic and methacrylic acids, between about 2 and about 4 weight percent of acrylic or methacrylic acid and a remainder of other monoethylenically unsaturated monomers selected from the group consisting of acrylates, methacrylates, monovinyl hydrocarbons having between 8 and 12 carbon atoms, and other modifying vinyl monomers; and (b) said crosslinking agent comprises monomeric methylated melamine resin having a number average molecular weight of between about 350 and about 1,000 and up to 30 weight percent based on the weight of said crosslinking agent of butylated melamine formaldehyde crosslinking agent having a number average molecular weight of between about 700 and about 2,500.

41. A coating composition in accordance with claim 30 or 40, wherein said random copolymer reactant (B) employed in preparation of said polymeric dispersion stabilizer of said flow control additive is prepared from ethylenically unsaturated monomers (i) and (ii) which are selected such that homopolymers thereof would be substantially soluble or insoluble in said organic liquid as a result of relative polarities of said homopolymers and said organic liquid.

42. A coating composition in accordance with claim 41, wherein said organic liquid of said flow control additive is a polar solvent.

43. A coating composition in accordance with claim 41, wherein said organic liquid of said flow control additive is a non-polar solvent.

44. A coating composition in accordance with claim 30 or 40, wherein at least a portion of said ethylenically unsaturated monomers (i), (ii) and (iii) used in preparation of said copolymer reactant (B) and at least a portion of said ethylenically unsaturated monomers (A) which are reacted with said copolymer reactant (B) to form said polymeric dispersion stabilizer, comprise acrylic monomers.

45. A coating composition in accordance with claim 44, wherein said copolymer reactant (B) used in preparation of said polymeric dispersion stabilizer of said flow control additive is characterized in that one of said ethylenically unsaturated monomers (i) or (ii) comprises an ester of a $C_4$-$C_{18}$ aliphatic alcohol and acrylic, methacrylic or ethacrylic acid, and the other of said ethylenically unsaturated monomers (i) or (ii) comprises an acrylic monomer selected from (a) esters of $C_1$-$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids.

46. A coating composition in accordance with claim 45, wherein said organic liquid of said flow control additive comprises aliphatic hydrocarbon and said copolymer reactant (B) used in preparation of said polymeric dispersion stabilizer of said flow control additive is characterized in that said ethylenically unsaturated monomer (i) is methylmethacrylate, and said ethylenically unsaturated monomer (ii) is 2-ethylhexylacrylate.

47. A coating composition in accordance with claim 46, wherein said polymeric dispersion stabilizer of said flow control additive is characterized in that one of said ethylenically unsaturated monomers (A) or (iii) is glycidyl acrylate or methacrylate and the other of said ethylenically unsaturated monomers (A) or (iii) is acrylic or methacrylic acid.

48. A coating composition in accordance with claim 30 or 40, wherein the functionalities of said first and second ethylenically unsaturated monomers (a) used to form said dispersed polymer of said flow control additive respectively are selected from the group consisting of: (a) acid and epoxide; (b) epoxide and amine; (c) acid anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

49. A coating composition in accordance with claim 48, wherein the dispersion of said flow control additive is formed by free radical addition copolymerization, in the presence of hydrocarbon dispersing liquid, of from about 1 to about 10 mole percent of alpha, beta-ethylenically unsaturated monocarboxylic acid, from about 90 to about 98 mole percent of at least one other copolymerizable monoethylenically unsaturated monomer, and from about 1 monomer selected 10 mole group consisting of ethylenically unsaturated monoepoxides.

* * * * *